United States Patent
Rochester et al.

(10) Patent No.: US 7,150,149 B2
(45) Date of Patent: Dec. 19, 2006

(54) EXTRACTING POWER FROM A FLUID FLOW

(75) Inventors: Geoffrey Kenneth Rochester, London (GB); Keith Pullen, London (GB)

(73) Assignee: Hydroventuri Limited, London (GB)

( * ) Notice: Subject to any disclaimer, the term of this patent is extended or adjusted under 35 U.S.C. 154(b) by 0 days.

(21) Appl. No.: 10/508,316

(22) PCT Filed: Mar. 19, 2003

(86) PCT No.: PCT/GB03/01171

§ 371 (c)(1),
(2), (4) Date: Nov. 30, 2004

(87) PCT Pub. No.: WO03/081029

PCT Pub. Date: Oct. 2, 2003

(65) Prior Publication Data

US 2005/0081517 A1   Apr. 21, 2005

(30) Foreign Application Priority Data

Mar. 20, 2002 (GB) .................. 0206623.1
Dec. 20, 2002 (GB) .................. 0229783.6

(51) Int. Cl.
*F03B 13/10* (2006.01)
(52) U.S. Cl. ........................................ 60/398
(58) Field of Classification Search .............. 60/398; 290/42, 43, 53, 54
See application file for complete search history.

(56) References Cited

U.S. PATENT DOCUMENTS

| | | | | |
|---|---|---|---|---|
| 680,951 A | * | 8/1901 | Waterhouse | ............ 96/207 |
| 1,005,911 A | * | 10/1911 | Wilbur | ............ 417/100 |
| 4,307,299 A | * | 12/1981 | Norton | ............ 60/398 |
| 4,372,113 A | | 2/1983 | Ramer | |
| 4,868,408 A | | 9/1989 | Hesh | |
| 5,142,870 A | * | 9/1992 | Angle | ............ 60/398 |
| 5,377,485 A | | 1/1995 | Bellamy | |
| 6,546,723 B1 | * | 4/2003 | Watten et al. | ............ 60/398 |
| 6,568,181 B1 | * | 5/2003 | Hassard et al. | ............ 60/398 |

FOREIGN PATENT DOCUMENTS

WO   99/66200 A   12/1999

* cited by examiner

*Primary Examiner*—Edward K. Look
*Assistant Examiner*—Michael Leslie
(74) *Attorney, Agent, or Firm*—Nixon & Vanderhye P.C.

(57) ABSTRACT

An apparatus for extracting power from a fluid flow comprising a fluid driveable engine, a fluid directing arrangement defining a channel in the flow of a primary fluid, the channel with a flow accelerating constriction shaped. The primary fluid accelerates as it passes through the flow accelerating constriction, the arrangement being formed to impart a rotational flow component to the primary fluid entering the constriction thereby creating a radial pressure gradient in the primary fluid as it passes through the constriction. A conduit for directing flow of a driving fluid different from the primary fluid and in fluid communication with the engine and a portion of the channel having accelerated fluid flow. Flow of driving fluid through the conduit drives the engine and delivers driving fluid to the fluid directing arrangement such that it is drawn substantially along the central axis of the rotational flow.

18 Claims, 8 Drawing Sheets

EXTRACTING POWER FROM A FLUID FLOW

This application is the U.S. national phase of international application PCT/GB 03/01171, filed 19 Mar. 2003, which designated the U.S. and claims priority to GB Application No. 0206623.1 filed 20 Mar. 2002 and GB Application No. 0229783.6 filed 20 Dec. 2002. The entire contents of these applications are incorporated herein by reference.

This invention relates to apparatus for extracting power from a fluid flow such as a tidal stream.

There is an increasing global demand for power. However, there is also an increasing awareness of the environmental pollution caused by traditional sources of power such as burning of fossil fuels. Accordingly, it is desirable to harness renewable sources of energy such as the energy available in sea or river currents and tidal streams and to use this extracted energy to generate electricity in a more environmentally friendly manner.

Conventional tidal stream energy extraction installations involve submarine propeller-driven turbines. These have the disadvantage that the mechanical and even electrical part must be placed under-water in a hostile environment where it is prone to damage, yet difficult to access and therefore costly to repair. Furthermore, such turbines often have to be incorporated in a barrage to provide the necessary head (i.e. the difference in water level between the inflow and the outflow of the energy extraction mechanism), and barrages are expensive and environmentally unfriendly.

A solution to these deficiencies was provided by WO 99/6620, which discloses a device in which a fluid driveable engine such as a turbine is situated above-water. A portion of the incoming tidal stream is directed through a channel having a flow accelerating constriction and the flow of a fluid through a conduit connecting the fluid driveable engine to a portion of the channel having an accelerated fluid flow drives the fluid driveable engine. However, the speed of the fluid inflow to the flow accelerating constriction is fairly slow (around 5 m/s) so that only a low-speed water turbine can be driven by this device. The constriction cannot be further reduced in diameter to increase the flow acceleration without introducing punitive power losses due to friction.

Co-pending patent application GB0206623.1 discloses a device in which the turbine is again situated above water, but the turbine is driven by an alternative fluid to that present in the fluid flow through the flow accelerating constriction. This system has the advantage that the fluid-driven engine can be driven by compressed air (transmission fluid) rather than water. Turbo-generators driven by compressed air at two or three atmospheres are much cheaper to build and maintain than low-head water turbines having comparable output capacity due to their small diameter and high speed. Use of such air driven turbo-generators obviates the need for massive watertight bearings and a gearbox. The system of the co-pending application uses both a primary and a secondary driving circuit (two-stage pressure amplification system) in addition to the circuit that circulates the alternative fluid through the fluid driven engine.

Introduction of a gaseous transmission fluid such as air directly into the primary driving circuit (i.e. the fluid flow circuit that passes through the flow accelerating constriction) is precluded in known energy extraction systems. This is due to the requirement of generating high suction pressures to effect delivery of air directly into the flow accelerating channel and to generate a pressure differential that is large enough for satisfactory turbine operation. Work has to be done to draw the driving fluid (air) from the water surface down to the point of entry of the flow accelerating constriction. In particular, the suction pressure must exceed the hydrostatic pressure at the depth h at which the flow accelerating channel is situated. The high suction pressures required are difficult to achieve using a standard flow accelerating constriction (which relies on the Bernoulli effect) with the relatively slow tidal streams from which the kinetic energy is to be extracted.

The present invention provides an apparatus for extracting power from a fluid flow, the apparatus comprising:

a fluid driveable engine;

a fluid directing arrangement formed to define a channel in the flow of a primary fluid, the channel having a flow accelerating constriction shaped such that the primary fluid accelerates as it passes through the flow accelerating constriction, the fluid directing arrangement being formed to impart a rotational flow component to the primary fluid entering the flow accelerating constriction thereby creating a radial pressure gradient in the primary fluid as it passes through the flow accelerating constriction;

a conduit for directing flow of a driving fluid, the driving fluid and the primary fluid being different fluids, the conduit being in fluid communication with the fluid driveable engine and a portion of the channel having accelerated fluid flow;

in which the flow of driving fluid through the conduit via the rotational flow of the primary fluid in the flow accelerating constriction acts to drive the fluid driveable engine and the conduit delivers driving fluid to the fluid directing arrangement such that the driving fluid is drawn substantially along the central axis of the rotational flow.

The apparatus of the present invention alleviates the disadvantages of the prior art by providing a system that is capable of introducing driving fluid directly to the flow accelerating constriction, even at large hydrostatic depths, the driving fluid being a different fluid from the primary fluid. This is achieved by providing a fluid directing arrangement operable to impart angular momentum (i.e. rotational flow) to the primary fluid as it enters the flow accelerating constriction. The rotational flow imparted by the fluid directing arrangement, in co-operation with the pressure reduction created in the flow accelerating constriction, produces a positive feedback effect on the primary fluid such that a pressure reduction substantially greater than that achievable from the Bernoulli effect alone is produced along a low pressure path corresponding to the axis of rotation of the fluid in the constriction. The driving fluid is introduced along this low pressure path to effect its transmission through the flow accelerating constriction. The driving fluid, having passed through the flow accelerating constriction acts to drive a fluid driveable engine.

Preferably, the fluid directing arrangement comprises at least one fluid deflector situated upstream of the flow accelerating constriction. This has the advantages of encouraging vortex formation at the desired location and enhancing the rotational flow in the flow accelerating channel thereby improving the suction achieved. Advantageously, the at least one fluid deflector is a static structure. This avoids the need to have moving parts underwater and correspondingly high maintenance costs.

Preferred embodiments comprise an air collection tank for collecting driving fluid from an outflow of the flow accelerating constriction. This simple air collection mechanism, facilitated by the rotational flow of the primary fluid as is passes through the flow accelerating constriction allows the energy extraction to be performed using a less complex circuit. It also allows for re-circulation of the driving fluid via a simple flow path from the outlet of the flow accelerating constriction through the fluid driveable engine and directly back to the input of the flow accelerating constriction.

Embodiments of the invention will now be described by way of example only with reference to the accompanying drawings in which.

Figure 1:
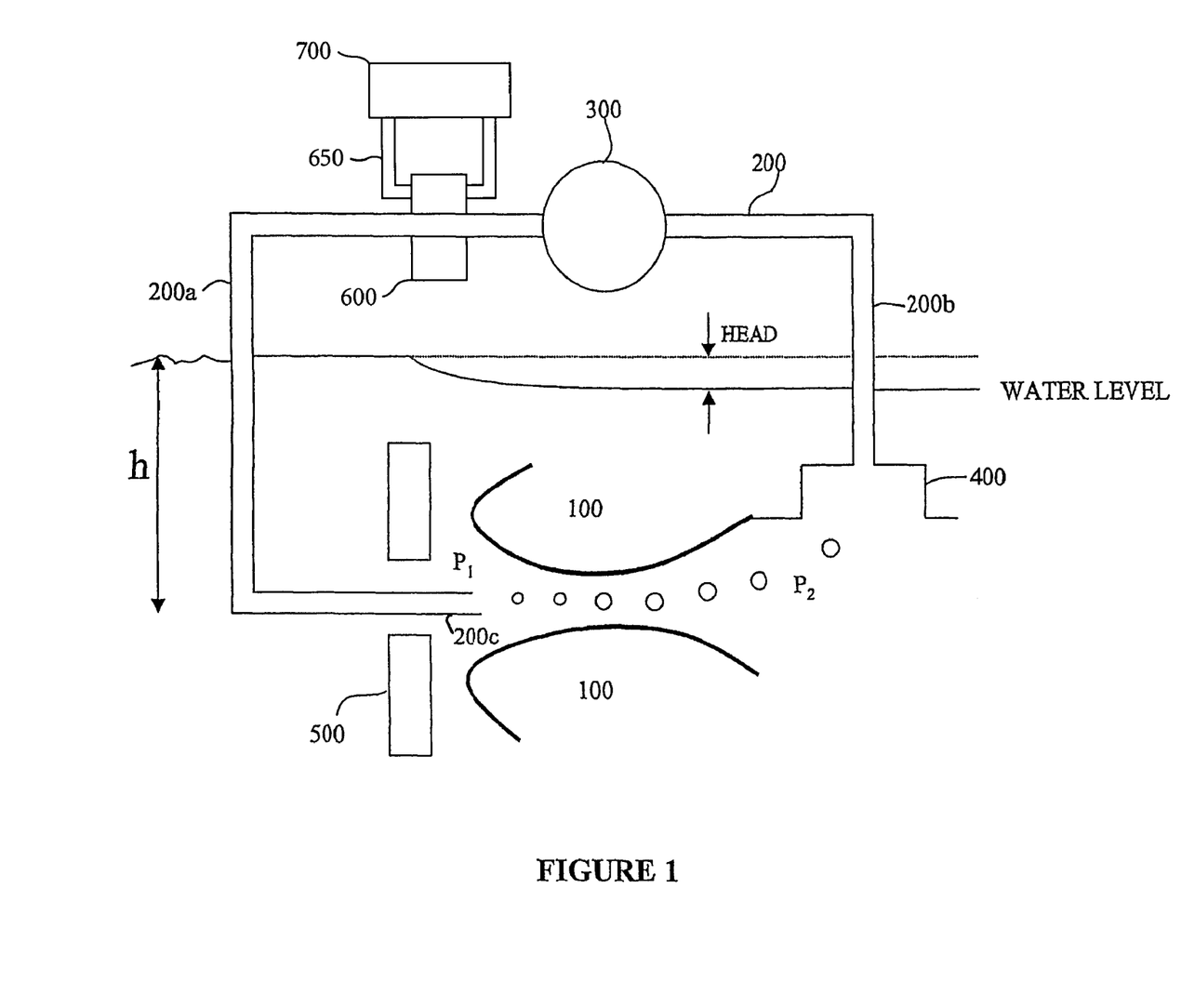
FIG. 1 is a schematic diagram of an apparatus for extracting power from a fluid flow according to a first example embodiment of the invention.

FIG. 1 is a schematic diagram of an apparatus for extracting power from a fluid flow according to a first example embodiment of the invention. The apparatus comprises a fluid directing arrangement 100, a conduit 200, a fluid driveable engine 300, a fluid collection tank 400 and a pair of fluid deflectors 500.

The fluid directing arrangement 100 is a cylindrical structure. From the cross-sectional view of the cylindrical structure shown in FIG. 1, it can be seen that the profile of the interior wall of the fluid directing arrangement resembles an aerofoil. The interior wall forms a channel through which fluid flows. The channel narrows to form a flow accelerating constriction through which the inflowing fluid passes before expulsion downstream at the tail of the fluid directing arrangement proximal to the fluid collection tank 400. Such a fluid directing arrangement 100 having a flow accelerating constriction is known as a "Venturi" since its general principle of operation is similar to that of the Venturi meter, which is used to measure the rate of fluid flow.

Due to continuity, the volume of fluid passing through the comparatively wide mouth of the fluid directing arrangement 100 per unit time equals the volume of fluid passing through the narrow portion of the channel (i.e. the flow accelerating constriction) per unit time. It follows that the velocity of the fluid as it passes through the constriction is greater than the velocity of the fluid as it enters the mouth of the fluid directing arrangement 100. According to Bernoulli's theorem $P+\frac{1}{2}\rho v^2+\rho gh=$constant, where P is the static pressure, v is the fluid velocity, $\rho$ is the fluid density, g is acceleration due to gravity and h is the height below a reference surface (in this case the water level). It follows that an increase in fluid velocity results in a decrease in the effective pressure $\rho gh$ at the constriction where the fluid velocity increases. The fluid flow through the fluid directing arrangement 100 will be denoted the primary fluid flow.

Bernoulli's theorem is generally applied to systems in which there is streamline (laminar) flow. Laminar flow occurs for small flow velocities in channels having small diameter whereas turbulent flow prevails in a channel having a large flow rate. However, even if the flow through a constriction in a channel is turbulent, the pressure will fall as the bulk velocity rises as described by Bernoulli's theorem. This is because to conserve fluid volume the flow must accelerate as the channel constricts. It can be shown by calculation and by direct experiment that Bernoulli's theorem is applicable to turbulent flow just as for streamline flow.

The conduit 200 provides a further, different fluid flow path for directing the driving fluid. The driving fluid (which is air in this particular embodiment) is driven down the portion 200a of the conduit to an inlet 200c close to the mouth of the fluid directing arrangement. The inlet 200c directs air substantially axially through the flow accelerating constriction. The inlet 200c formed by the conduit is at height h below the water surface. The air flows through the channel formed by the flow directing arrangement 100, expanding as it passes through the reduced pressure region of the flow accelerating constriction. The expanding air in the constriction increases the pressure of the surrounding water. The work done by the primary fluid against the increasing resistance of the expanding air imparts energy to the air and generates a pressure head across the flow directing formation 100. The air emerging from the fluid accelerating constriction should continue to pass along the axis of the vortex for some time after emerging from the fluid accelerating constriction and will thus travel towards the fluid collection tank 400 where it is collected for subsequent circulation through the fluid-driven engine 300. The rotational flow of the primary fluid that has already passed through the flow accelerating constriction will ultimately be obliterated by turbulence in the fluid directing arrangement.

The compressed air passes along with the primary fluid (in this case water) through the flow accelerating constriction and is collected by the fluid collection tank 400. In this particular embodiment the fluid collection tank is situated adjacent to the outlet tail of the fluid directing arrangement 100 and collects driving fluid downstream of the fluid accelerating constriction. The fluid collection tank has radial plates which serve to at least partially remove rotational flow of the incoming driving fluid.

In alternative embodiments, in which the tail of the fluid directing arrangement is sufficiently long, the driving fluid may be collected via a slot in the upper portion of the tail of the fluid directing arrangement which feeds the driving fluid to a fluid collection tank above via an exhaust tail pipe connecting the slot to the collection tank. In further alternative embodiments a cascade of collection trays is provided at different levels (i.e. differing distances from the central axis of the fluid directing arrangement) to intercept rising driving fluid (e.g. air) as it emerges from the flow accelerating constriction. Each collection tray feeds a narrow-bore vertical pipe which rises from the collection tray to a common fluid collection tank.

Returning to the embodiment of FIG. 1, compressed air from the fluid collection tank 400 flows up through the portion 200b of the conduit and is subsequently supplied to the turbine 300. The turbine 300 is driven by the flow of air from the air collection tank 400 to the inlet 200c via the flow accelerating constriction. Air at the inlet of the fluid directing arrangement 100 is at pressure $P_1=P_0+\rho gh-p$, where $P_0$ is atmospheric pressure and p is the suction pressure developed by the flow accelerating constriction. By way of contrast, the pressure at the outlet of the fluid directing arrangement is $P_2=P_0+\rho gh$. Accordingly, the air pressure across the turbine is $\rho gh-(\rho gh-p)=p$. Air is pumped down to the inlet 200c at pressure $P_1$ and re-emerges from the fluid directing arrangement at pressure $P_2$. Provided that $P_2>P_1$, the fluid driveable engine 300 can be driven by the pressure difference. However, the performance of the turbine is dependent upon the pressure ratio $P_2/P_1$, rather than the pressure difference. A ratio $P_2/P_1=4$ is adequate, although efficiency improves for larger ratios.

As shown in FIG. 1, a pressure head is created across the Venturi. Such a pressure head is created by placing an obstruction in the water. The obstruction may be created by the fluid directing arrangement 100 itself (as in the embodiment of FIG. 8 described below). However, in the embodiment of FIG. 1, the pressure head is created by a dam (not shown) situated upstream of the Venturi.

The pressure $P_1$ at the inlet 200c should be sufficiently high so that air does not come out of solution. The pressure at the inlet 200c may be less than atmospheric pressure $P_0$ ($P_0$ is approximately equivalent to 10 meters of water) due to the suction pressure p. At atmospheric pressure a certain quantity of air will be in solution in the water. However if the pressure is reduced to about 0.25 atmospheres, at least a proportion of the dissolved air will come out of solution. If the pressure is further reduced to about 0.15 atmospheres and the temperature is around 20 degrees centigrade then the water will boil. To reduce the likelihood of air bubbles forming spontaneously (a process known as "cavitation") the pressure should be at least 0.2 atmospheres (equivalent to 2 meters of water). This means that $P_1$ should be at least at a pressure equal to of 2 meters of water, in which case $p=(P_0+\rho gh-2 \rho g)$, where $P_0=1.013\times10^5$ N/m$^2$; $\rho_{water}=1000$ kg/m$^3$; $g=9.8$ m/s$^2$; so $h_{1atoms}=P_0/\rho g=10.34$ m of water. Satisfactory turbine operation requires a pressure ratio of at least 4. Provided that this condition is satisfied, electrical power can be extracted irrespective of the depth of the Venturi system, though higher pressure ratios do improve turbine efficiency.

Note that suction is a negative pressure, so a suction of −0.6 bar would correspond to a pressure of 1−0.6, if the suction were applied to some volume which would otherwise be at atmospheric pressure. If the suction is −0.75 bar (where 1 bar is approximately one atmosphere), and the Venturi is situated at h=7.5 m, then air would be sucked into the Venturi but the suction would exactly cancel the hydrostatic pressure, so there would be no work that could be done by air going in at the input (assuming that the air is lost at the tail of the Venturi 100). However, if the Venturi was to be placed just below the surface of the water, the hydrostatic pressure would be negligible. In this case, a pressure ratio ($P_2/P_1$) of 1/0.25 would be obtained if the air was directed through a turbine and subsequently fed back to the Venturi mouth as input.

If h=12 m, the suction has to be of smaller magnitude than 19.5 m, otherwise air will come out of solution (since $P_1$ will be too low). In this case, the air at the input is at 0.25 bar (or equivalently 0.25 atmospheres or 2.5 m of water) whereas the air at the output, $P_2=10$ m (atmospheric pressure)+12 m (depth h)=22 m. Accordingly the pressure ratio would be 22/2.5.

Consider a Venturi operating on the suction pressure achievable via the Bernoulli effect alone. Let the ratio of the Venturi diameter at the widest point of the channel to the Venturi diameter at the narrowest point (the throat) of the channel be equal to 4, as is typical. Then if water enters the mouth of the Venturi at a stream velocity, v, of 5 m/s (which is a high speed for a tidal current), the speed of water through the throat will be 20 m/s. The suction is given by 0.05 $v^2=0.05\times400=20$ m, which is approximately equivalent to 2 atmospheres. Given that 5 m/s is a high speed for a tidal current and the obstruction presented to the tidal stream by the Venturi will tend to reduce the stream speed. Hence it will be appreciated that a suction pressure of 2 atmospheres is at the upper limit of that achievable by exploiting the Bernoulli effect alone. Suction pressures of higher than 2 atmospheres are required in order to achieve good power transfer efficiency. Clearly this will require higher suction pressures than those achievable via the Bernoulli effect alone.

Figure 2:
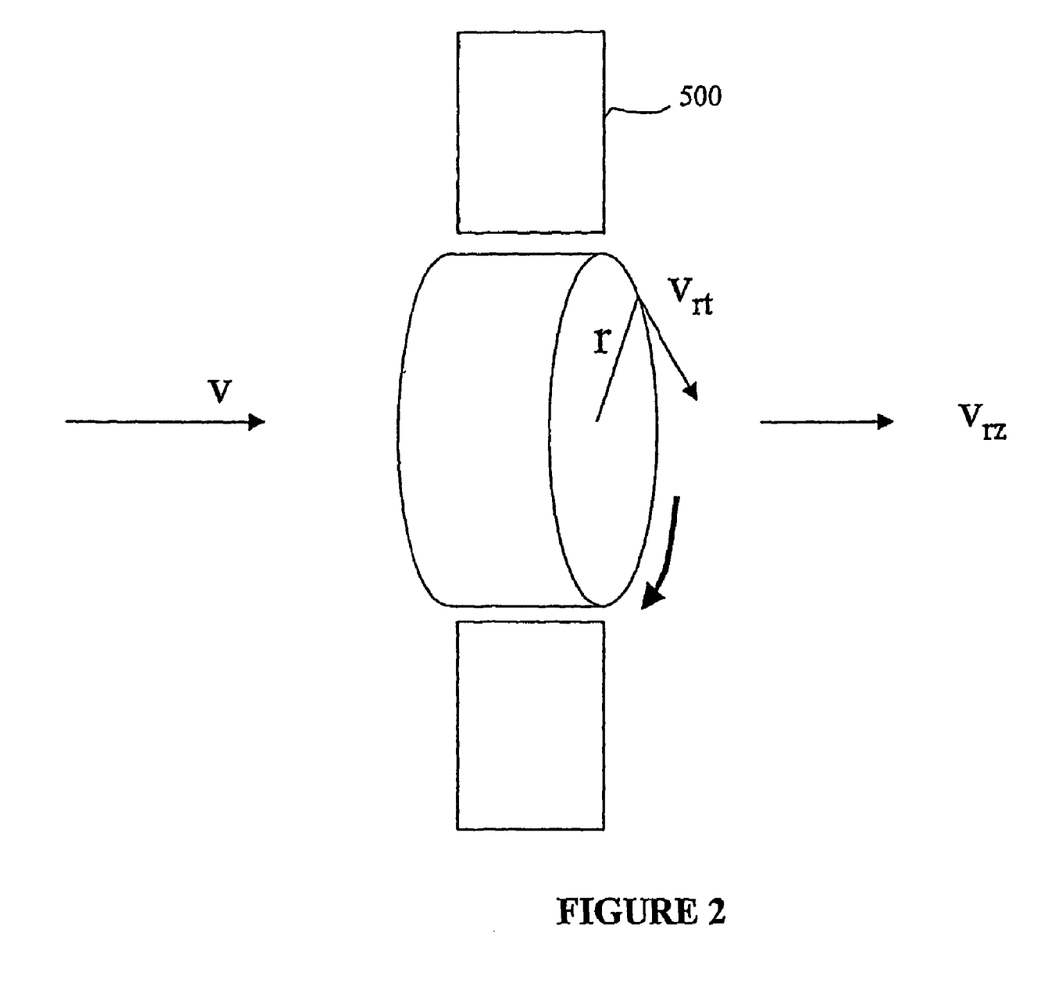
FIG. 2 is a schematic illustration of a cylinder of fluid having a tidal flow velocity along the z-axis to which a component of angular velocity has been imparted.
Figure 3:
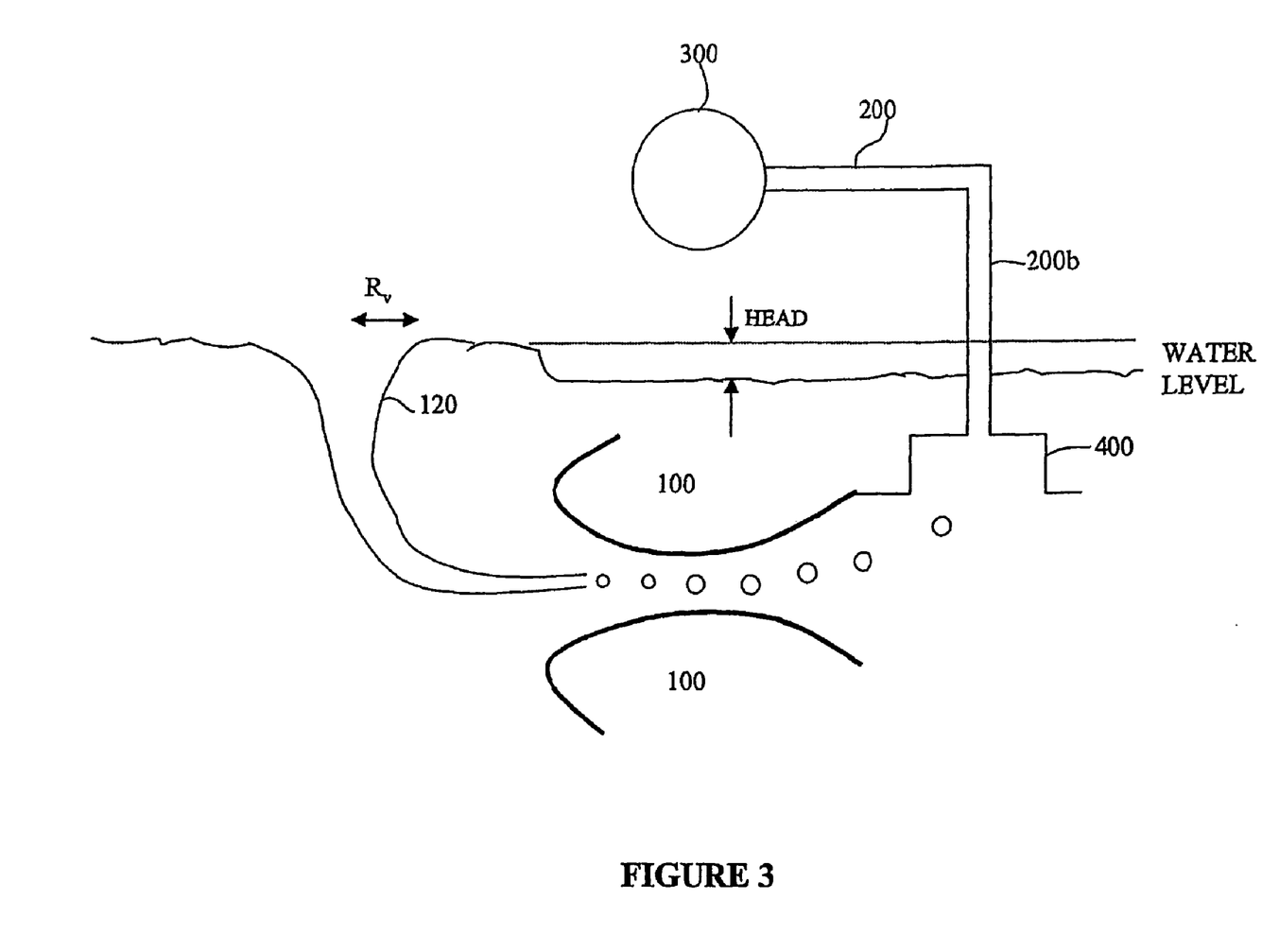
FIG. 3 is a schematic diagram of an apparatus for extracting power from a fluid flow according to a second example embodiment of the invention.

High suction pressures are achieved in the arrangement of FIG. 1 by using the deflectors 500 to impart angular momentum to a portion of the incoming tidal flow just before it enters the fluid directing arrangement 100. FIG. 2 schematically illustrates a cylinder of fluid having a tidal flow velocity along the z-axis to which a component of angular velocity ω has been imparted. In FIG. 2, as in FIG. 1, deflectors 500 are used to impart angular momentum to the fluid. However, the deflectors 500 are optional since it is recognised that rotational flow may occur spontaneously in the channel of the Venturi due to small instabilities in fluid flow. FIG. 3, described below, is an example embodiment which relies on spontaneous vortex formation.

Figure 4A:
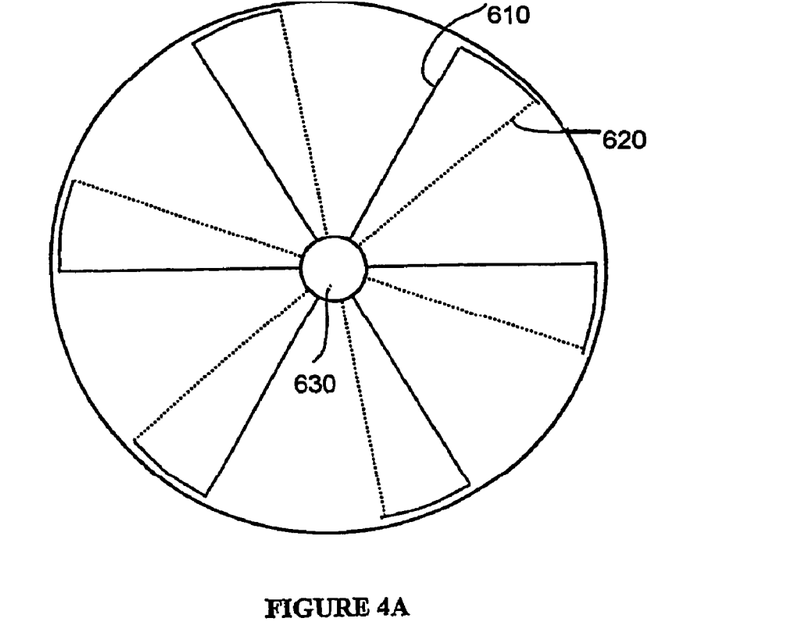
FIG. 4A is a schematic diagram of a stator having fixed angle blades corresponding to a first deflector arrangement suitable for use in the apparatus of FIG. 1.
Figure 4B:
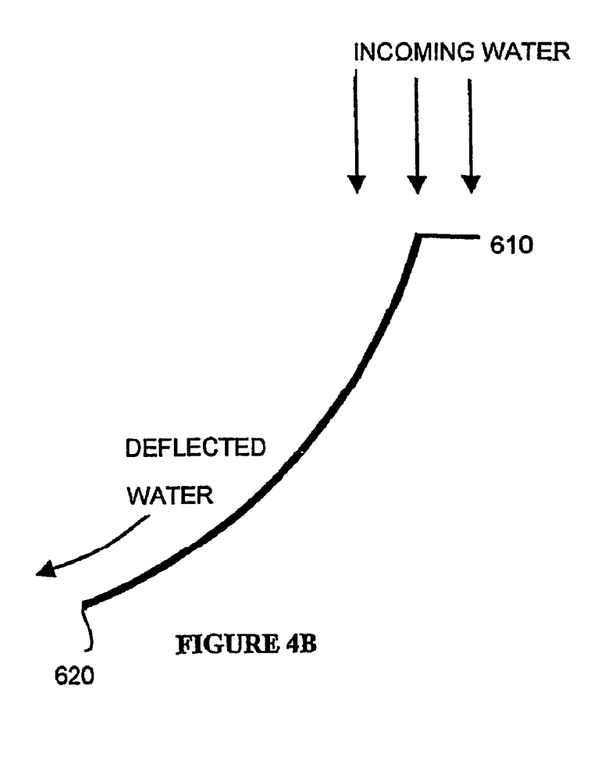
FIG. 4B schematically illustrates the shape of a single blade of the stator of FIG. 4A.

In the example embodiment of FIG. 1, the deflectors 500 correspond to a stator having a static array of fixed angle blades as schematically illustrated in FIG. 4. The stator is similar in structure to a turbofan on a jet engine, although the stator has fewer blades. Each blade is almost triangular in shape with a very small apex angle and has a leading edge 610 and a trailing edge 620. The air pipe 220c enters via a central aperture 630 in the stator. FIG. 4B schematically illustrates a single blade as viewed from the base of the triangle, with the apex pointing away from the eye. From this view the blade appears as a short arc of a large circle, the arc being formed from the leading edge 610 to the trailing edge 620 of a given blade. The approaching primary fluid is initially parallel to the surface of the blade, but is subsequently deflected to one side by the curvature of the arc. Thus the deflector imparts angular momentum to primary fluid flowing across it. The blades impart angular momentum rω (where r is the radius of the circular cross section of fluid) to the incoming water forcing it to rotate substantially like a solid body (i.e. in a coherent manner such that the angular velocity is constant for all water entering the system). An advantage of using static blades rather than blades attached to a turbine is that fixed blades can be simply be unhooked and removed from the water for cleaning. Cleaning is likely to be required due to fouling of such structures in the typical underwater environment in which the energy extraction apparatus is in installed. In alternative embodiments, appropriately shaped deflectors without blades are used. In one such alternative embodiment a solid object is situated such that it obstructs the primary fluid as it enters the fluid directing arrangement 100. If such a solid object obstructs half of the mouth of the fluid directing arrangement, but is situated some distance away from the mouth (i.e. some distance upstream of the mouth), the stream will tend to flow into the flow accelerating constriction parallel to the central axis of the constriction but from one side only. This imparts a rotational component to the primary fluid as it enters the flow accelerating constriction. Since vortices naturally rotate clockwise in the northern Hemisphere (due to the direction of rotation of the Earth), the side of the mouth that is blocked may thus be determined.

In FIG. 2, the incoming tidal stream has a linear velocity v along the z-axis. Assuming that there are no frictional losses, the kinetic energy (and hence the resultant velocity v) of the cylinder of water before and after deflection is the same, although the axial component of velocity $v_{rz}$ decreases and a tangential component of velocity $v_{rt}$ is imparted to the cylinder of water. Since energy is conserved it follows that $v^2=v_{rz}^2+v_{rt}^2$. The angular rotation of the cylinder of fluid results in a centrifugal force in the non-inertial reference frame of the fluid. The centrifugal force creates a pressure differential whereby pressure increases between the centre and the circumference of the cylinder.

The pressure increase due to the centrifugal force can readily be shown to be equal to $v_{rt}^2/2\ g=r^2\omega^2/2\ g$ at radius r. The deflectors 500 have forced all water entering the fluid directing arrangement 100 to have substantially constant angular velocity $\omega$, at least initially on entry to the mouth of the fluid directing arrangement 100. Accordingly, the pressure increase due to centrifugal force is greatest at the circumference, that is, proximal to the inner wall of the channel formed by the inlet horn of the fluid directing arrangement 100. As the fluid progresses through the flow accelerating portion of the channel under the influence of $v_{rz}$, the radially dependent pressure increase due to centrifugal force at least partially offsets the pressure reduction (associated with the Bernoulli effect), which arises due to the increase in $v_{rz}$ induced by the flow accelerating constriction. As a consequence, the acceleration imparted to the water in the flow accelerating constriction is reduced in a radially dependent manner, in accordance with the magnitude of the centrifugal force at a corresponding radius.

The competing actions of the pressure gradient associated with the centrifugal force and the pressure reduction associated with the Bernoulli effect in the flow accelerating constriction have the effect of artificially narrowing the channel in the region of the constriction. Accordingly, $v_{rz}$ in the region of the central axis of the vortex is significantly greater than $v_{rz}$ close to the walls of the channel.

Now consider what happens to the cylinder of rotating fluid in FIG. 2 as it passes through the flow accelerating constriction of the flow directing formation 100. Assuming that the cylinder rotates substantially like a solid body and neglecting the effects of any secondary vortices that may form, angular momentum must be conserved as the channel narrows. For a solid body rotating at angular velocity $\omega$, the angular momentum is proportional to $r^2\omega$, so that if angular momentum is to be conserved $r_1^2\omega_1=r_2^2\omega_2$. Sinc radius r decreases ($r_2<r_1$) as the fluid flows towards the narrowest point of the flow accelerating constriction, the angular velocity must increase ($\omega_2>\omega_1$) to conserve angular momentum.

However, since centrifugal pressure increases radially, thereby creating a resistance to fluid motion, fluid from the outer regions of the channel is forced to flow towards the centre as the channel narrows. The decrease in the moment of inertia due to inward flow of fluid mass also causes an increase in angular velocity (analogous to an ice-skater pulling in her arms to effect a faster spin) to conserve angular momentum. Assuming that $r^2\omega$ is constant and given that the centrifugal pressure is given by $r^2\omega^2/2\ g$, it follows that centrifugal pressure is equal to $k\omega$ where k is a constant. Accordingly, since $\omega$ increases more for more for smaller r than for larger r, it follows that centrifugal pressure also increases more for small r.

Accordingly, imparting angular velocity to the primary fluid on entry to the fluid directing arrangement results in vortex formation in the channel due to a positive feedback mechanism whereby the spinning water creates a blocking effect at large radii. In turn, this blocking effect forces fluid mass towards the centre of the flow thereby decreasing the moment of inertia and driving an increase in angular velocity for conservation of angular momentum. This increase in angular velocity further increases the centrifugal pressure close to the walls of the flow accelerating constriction (i.e. at large radii).

This positive feedback mechanism progresses until the pressure along the axis is (at least theoretically) substantially zero so that no further pressure reduction can be achieved. The positive feedback mechanism, induced by imparting an angular velocity to the incoming fluid flow entering the mouth of the fluid directing arrangement 100, results in a large suction pressure being created along the axis of the flow accelerating constriction. The large suction pressure is achievable regardless of the primary stream speed v and the depth h at which the fluid accelerating constriction is situated. In the first example embodiment of FIG. 1 fluid flow deflectors 500 are used to impart angular momentum to the primary fluid on entry to the mouth of the Venturi.

Imparting angular momentum to the fluid entering the mouth of the Venturi 100 significantly increases the suction relative to the suction that would be achieveable by exploiting the Bernoulli effect alone (i.e. without spinning the primary fluid). When the entering the fluid has rotational motion the hydrostatic pressure at the inlet 200c can be overcome more easily, so that the Venturi 100 may be situated at greater depth h without having recourse to forcing the air down to the inlet 200c of the conduit using an auxiliary pump. If the driving fluid (e.g. air) was directly introduced to a non-rotating flow of primary fluid (e.g. water) at the mouth of the Venturi 100, the air would not be driven towards the axis of the Venturi, so it would disturb the water flow, rendering it more turbulent and greatly increasing losses in the throat and tail of the Venturi 100.

As mentioned above, although the deflectors 500 serve to deliberately induce vortex formation by exploiting the positive feedback mechanism in the flow accelerating constriction, the deflectors are not essential to obtaining the vortex since even small imbalances in flow of the primary fluid through the Venturi 100 may be sufficient to induce the positive feedback mechanism. Accordingly, an alternative embodiment of the invention comprises all structural components of FIG. 1 except the fluid flow deflectors 500. In such an embodiment the air inlet portion 200c of the conduit should be situated such that it substantially coincides with the central axis of the vortex formed within the Venturi 100. The central axis of a spontaneously formed vortex will not necessarily coincide with the central axis of the flow accelerating constriction of the Venturi. However, the symmetry of the Venturi channel will largely determine how the vortex is spontaneously formed so that if the channel has a rotationally symmetric cross-sectional area, the central axis of the vortex and of the channel itself are likely to substantially coincide. Furthermore, the position of the conduit inlet 200c may be adjusted in situ to substantially align it with the central axis of the vortex thereby enabling flow of the driving fluid through the Venturi. However, even if the conduit air inlet 200c does not exactly coincide with the axis of rotation of the primary fluid, the air will always be "squeezed" towards the axis provided that the squeezing effect overwhelms the buoyancy of the air. This is because the lowest pressure is always on the axis if water is spinning.

FIG. 3 is a schematic diagram of an apparatus for extracting power from a fluid flow according to a second example embodiment of the invention in this example embodiment. This second embodiment is a further example of an embodiment in which fluid deflectors are not used to create the rotational flow. Furthermore, in this embodiment the driving fluid (air) is not supplied to the mouth of the Venturi by a portion of conduit (200*a*, 200*c* in FIG. 1) fed from the outflow of the turbine 300. Rather, the driving fluid inlet is a spontaneously formed vortex 120 that extends from the water surface down to the mouth of the Venturi 100. Air is sucked into the core of the vortex from the atmosphere at the water's surface and air bubbles are entrained in the swirling water of the vortex which drives them down to the mouth of the Venturi 100 whereupon the air is sucked through the flow accelerating constriction to the air collection tank 400. It can be seen from FIG. 3 that the radius $R_v$ of the vortex at the water's surface is much larger than the radius of the vortex at the mouth of the Venturi. The flow of compressed air from the air collection tank at the exhaust of the Venturi 100 up through a portion of conduit 200 and into the turbine 300 acts to drive the turbine. However, the embodiment of FIG. 3 differs from that of FIG. 1 in that the outflow of expanded air from the turbine 300 is not re-circulated back down to the mouth of the Venturi 100.

In embodiments of the invention, such as those schematically illustrated in FIGS. 1 and 3, the axial pressure (i.e. the pressure close to the central axis of the vortex) in the flow accelerating constriction of the Venturi 100 is likely to be driven towards zero as a result of the rotational fluid flow, regardless of the depth below the water surface h, of the flow directing formation and inlet nozzle 200*c*. Thus the device is suitable for deep-water operation. Embodiments of the invention use the rotational flow of water in the Venturi to achieve high suction pressures, which means that the exhaust pressure of the turbine will be low. The high suction pressures achievable mean that a pressure ratio $(P_2/P_1)$ of 4 is feasible, even for deep water operation, so that efficiency can be retained.

Embodiments of the invention typically use a single stage of pressure amplification, the pressure amplification being provided by the flow accelerating constriction. The driving fluid (e.g. air) is delivered directly to the Venturi 100. The Venturi 100 does not require any nozzles or inlets to operate effectively, which means that flow resistance is reduced. Since the primary fluid flows rapidly through the Venturi, fouling is less likely to be a problem in these systems.

The positive feedback mechanism induced by the combination of the flow accelerating constriction and the rotational flow imparted by the fluid directing arrangement makes the suction pressure required for efficient turbine operation realistically achievable. If the fluid directing arrangement 100 is situated at sufficient depth, the transmission fluid (in this case air) will be sufficiently compressed that it can be used to drive the turbine 300. If, on the other hand, the fluid directing arrangement is situated only a short distance under water, the air turbine 300 is effectively driven by the suction created rather than the compressed air generated. Since the pressure differential achievable through suction is comparatively small (since water begins to foam at suction pressures around $0.75 \times 10^5$ N/m²) such an air turbine would have to work on a pressure difference of around 1 atmosphere, which may not be very efficient. Accordingly operation of the device when it is situated at a significant depth below the water level (h>>12 m) is preferable to shallow water operation.

In general, the efficiency of the fluid directing arrangement 100 is related to its area ratio. The area ratio is the ratio of the cross-sectional area at the widest portion of the channel formed by the flow directing formations 100 to the cross-sectional area at the narrowest point (i.e. the throat) of the flow accelerating constriction. A typical area ratio would be, for example 3.5, with a throat diameter of 0.75 m. The area ratio will be appropriately selected in view of engineering, weight and cost considerations. In general, the smaller the area ratio of the fluid directing arrangement, the greater the efficiency. However, the area ratio selected for the best possible efficiency will depend upon the speed of the incoming stream of fluid. Due to the positive feedback mechanism induced by the flow deflectors 500, the difference between the cross-sectional area at the throat of the flow accelerating constriction relative to that at the widest point need not be large. The wider the throat, the smaller the resistance to flow of the primary fluid so that the device in which the positive feedback mechanism is employed offers improved efficiency relative to known devices.

In view of the fact that the low-pressure region along the axis of the channel formed by the flow accelerating constriction theoretically has a cross-section of very small radius. It follows that the inlet nozzle 200*c* where the driving fluid enters the flow directing formation should also have a small radius (say 0.1 m or less). To facilitate fluid expulsion via a small diameter outlet, the driving fluid should have a low viscosity. A driving fluid such as air is appropriate for emission from a small-diameter outlet whereas water has too high a viscosity. Since the power delivered by a turbine is related to the mass of driving fluid passing through it per unit time, the density of the air is an important factor in determining energy output. Since the density of air is higher in deeper water, the air inlet 200*c* to the Venturi 100 can have a smaller diameter if the Venturi 100 is situated at a greater depth. For the energy extraction device to work most effectively the driving fluid should be expelled such that it directly enters the low-pressure region along the central axis of the vortex. Although if the driving fluid is fed in off-axis, it should be driven towards the axis by the pressure differential created by the rotation.

Figure 5:
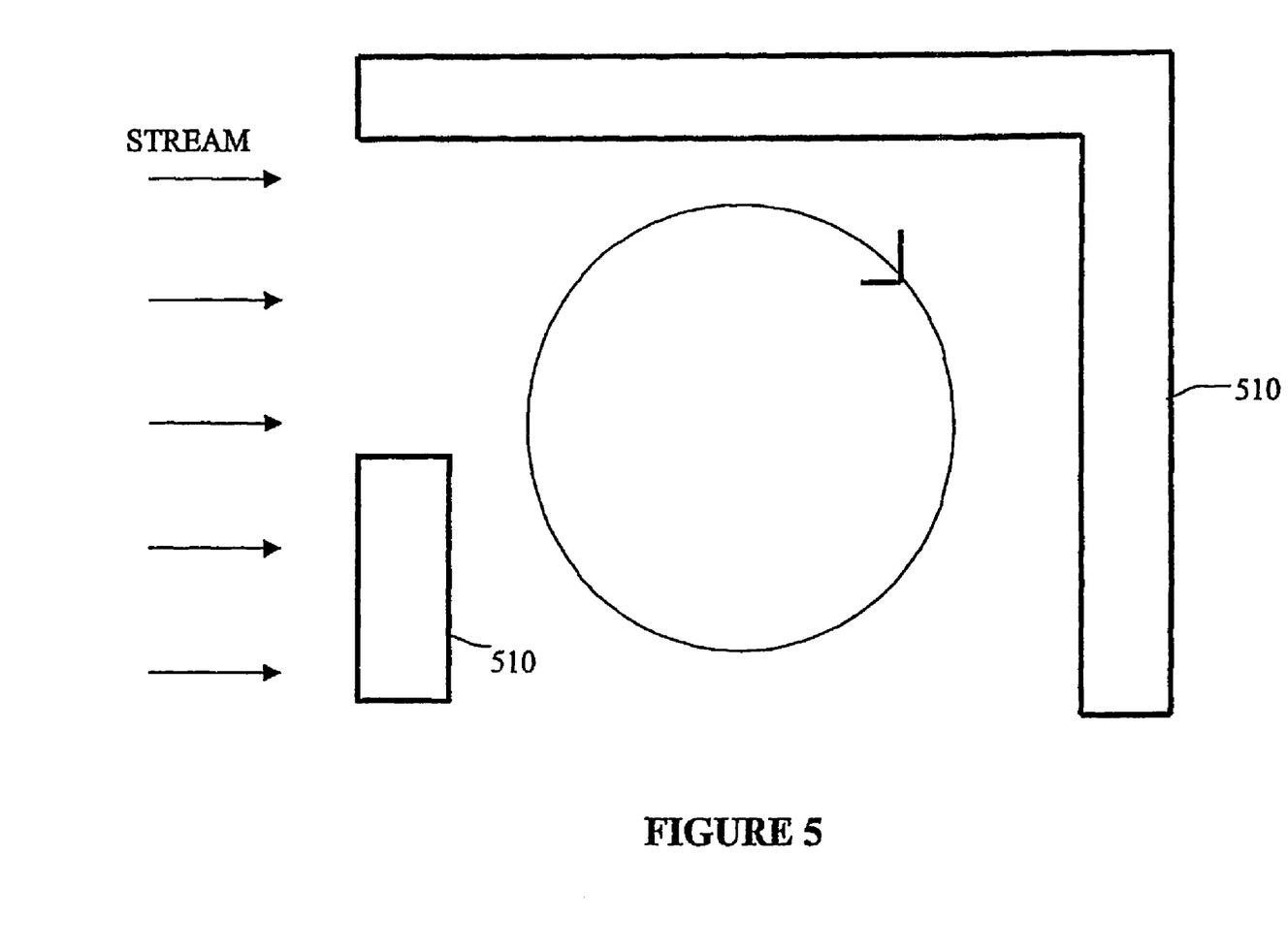
FIG. 5 is a schematic diagram illustrating a plan view of a second deflector arrangement.
Figure 6:
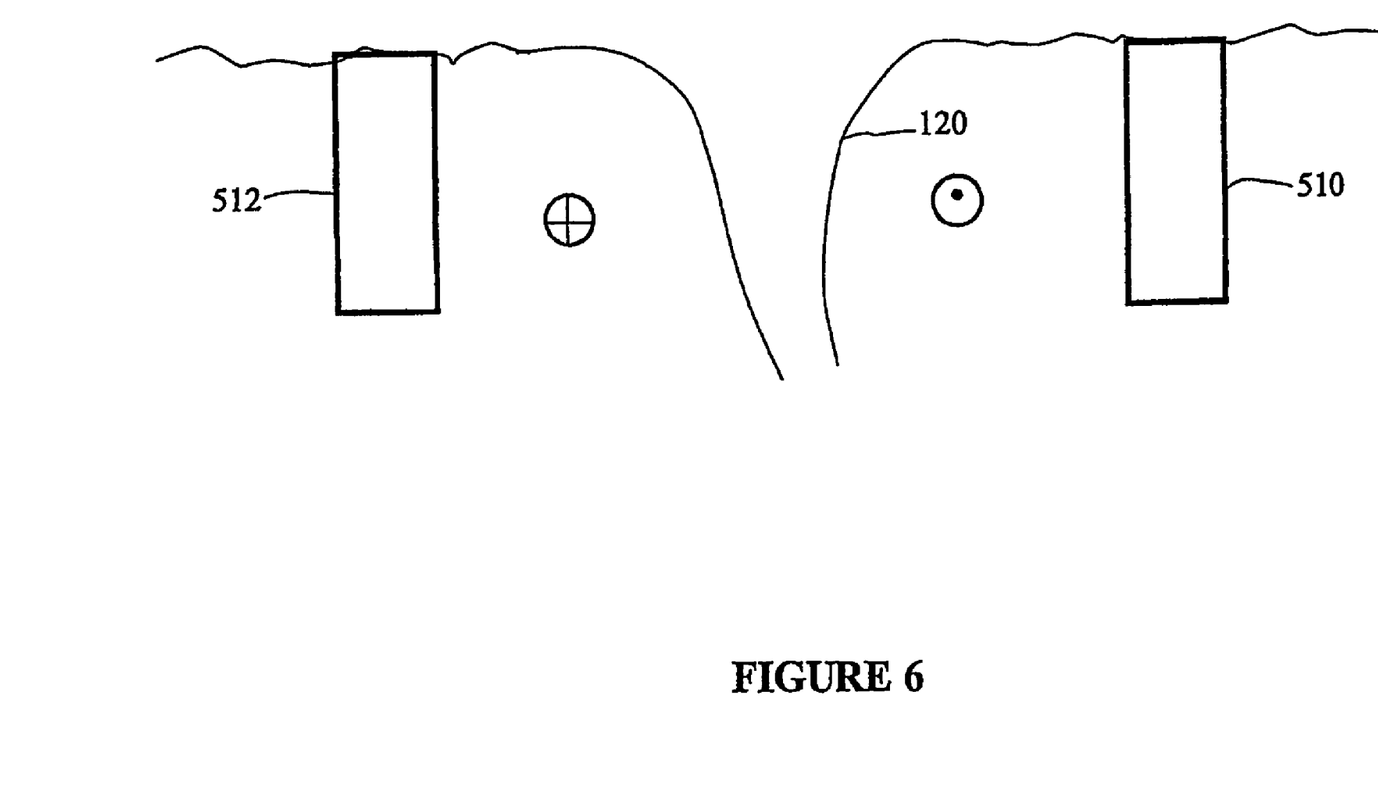
FIG. 6 is a schematic diagram illustrating a side elevation of the second deflector arrangement of FIG. 5.

FIG. 5 schematically illustrates a plan view of a further possible structure for the deflectors 500 of FIG. 1. In this case the deflectors are formed by static walls 510, 512 which obstruct the incoming stream of water (entering from the left in the Figure). One of the walls 510 is an L-shaped formation and the other is a straight wall 512. Water from the incoming stream passes through a gap between the L-shaped wall 510 and the straight wall 512 and the obstruction to the flow provided by the walls encourages vortex formation 120 within the space defined by the walls. The sense of rotation of the vortex is clockwise in this case and is indicated by an arrow. FIG. 6 shows a side elevation of the static wall deflector structure of FIG. 5. In this case the sense of rotation of the primary fluid is indicated by a cross-symbol (closest to wall 512) which indicates flow of primary fluid into the plane of the page and a dot symbol (closest to wall 510) which indicates flow of primary fluid out of the plane of the page. The static wall deflectors illustrated in FIGS. 5 and 6 are appropriate for use in relatively shallow water.

Figure 7A:
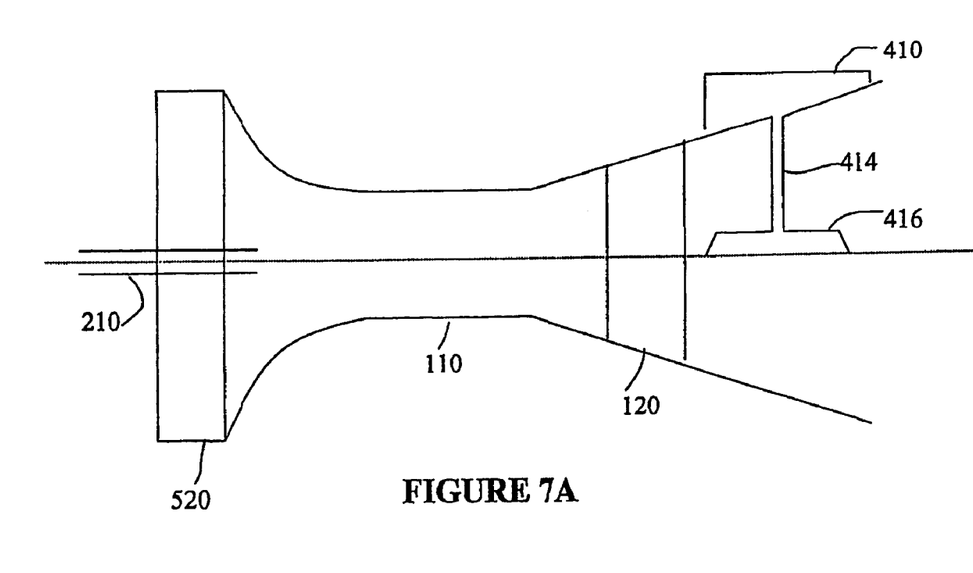
FIG. 7A is a schematic diagram of a third example embodiment of the invention in which a vertical fin is used to inhibit rotational motion beyond the throat of the fluid directing arrangement.
Figure 7B:
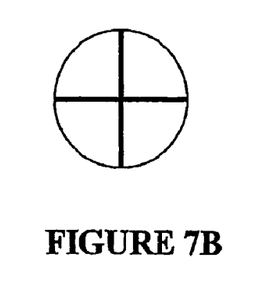
FIG. 7B schematically illustrates a cross sectional front view of a fluid deflector of the apparatus of FIG. 7A.
Figure 7C:
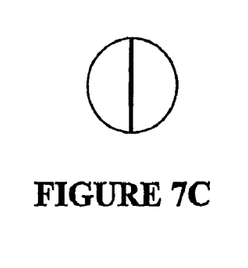
FIG. 7C schematically illustrates a cross sectional view of the rotation inhibiting member of the embodiment of FIG. 7A.

FIG. 7A schematically illustrates a third example embodiment of an energy extraction apparatus. In this embodiment the fluid collection tank 400 is situated in the tail of the Venturi. The fluid collection tank 400 comprises a collection tray 412 which extends into the channel of the Venturi and is connected to a tank 410 via a narrow channel 414 that extends through a slot in the body of the tail section of the Venturi down into the Venturi channel. The apparatus comprises a primary deflector 520 situated at the mouth of the Venturi which imparts rotation to fluid as it enters the fluid accelerating constriction 110 and a rotation inhibiting member 120 situated beyond the fluid accelerating constriction 110. between the primary deflector 520 and the tank 410. The rotation inhibiting member 120 serves to inhibit the rotational flow of fluid passing out of the fluid accelerating constriction towards the driving fluid collection tray 412. FIG. 7B schematically illustrates a cross-sectional front view of the primary deflector 520. The deflector blades are structurally identical to those described in relation to FIGS. 4A and 4B. FIG. 7C schematically illustrates a cross-section of the rotation inhibiting member 120 which comprises a vertical fin to at least partially stop rotation of fluid emerging from the fluid accelerating constriction before it passes further along the tail of the Venturi 100 to the fluid collection tray 412. Air from the water surface is supplied to the mouth of the Venturi via a conduit which leads to an air inlet pipe 210.

The air inlet pipe 210 at the mouth of the Venturi will be generally be at atmospheric pressure $P_0$ whereas the air tank 410, situated at a depth $H_{tank}$ is at a pressure of $(P_0 + \rho g H_{tank})$. A small positive pressure $p_{inlet}$, where $P_{inlet} << \rho g H_{tank}$ may need to be applied at the inlet 210 to drive air into the inlet pipe and on through the Venturi 100. Air flow from the tank 410 to the air inlet pipe 210 acts to drive the turbine 300.

Figure 8:
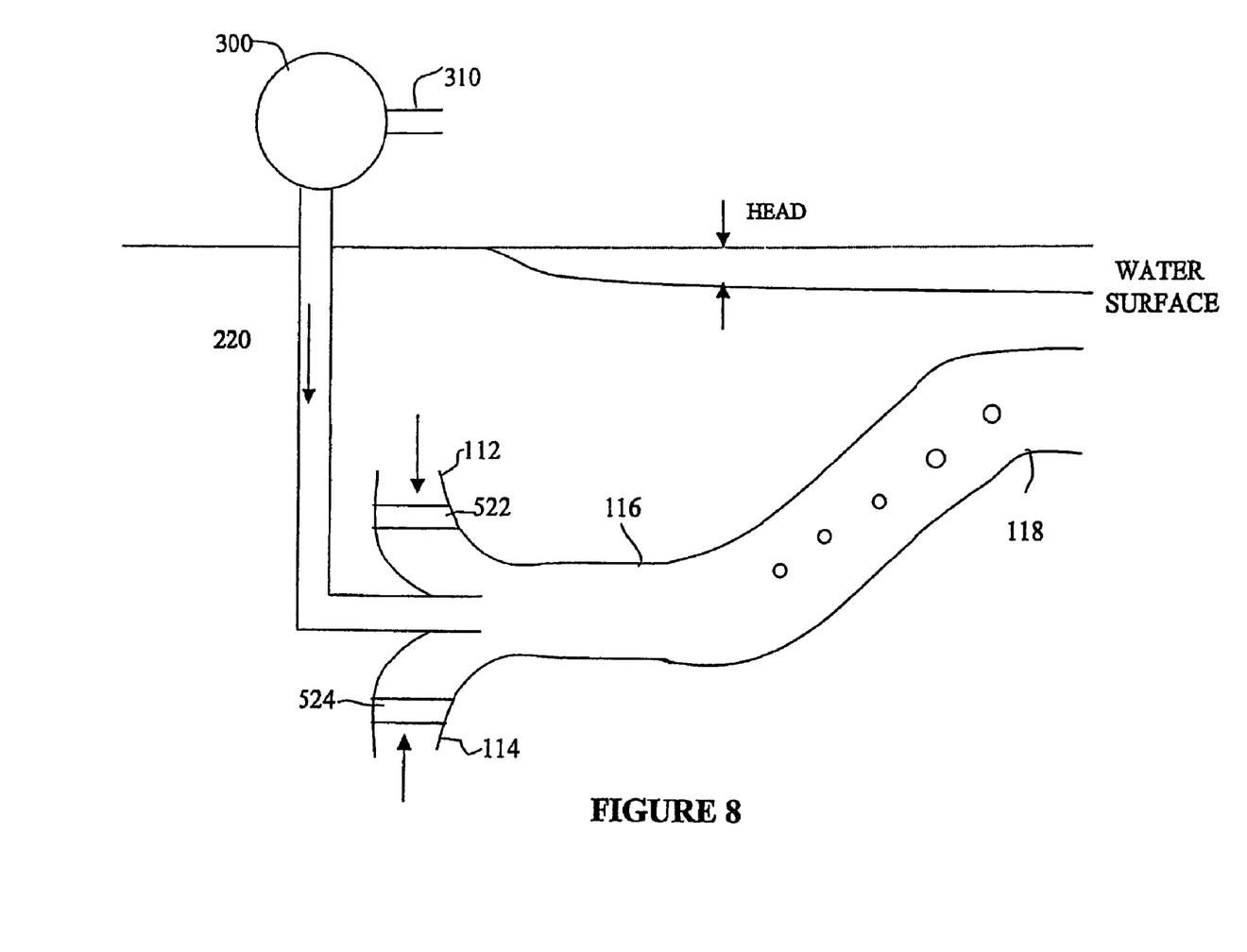
FIG. 8 is a schematic diagram of a fourth example embodiment of the invention in which the fluid directing arrangement has an inflow with a deflector on either side of the air inlet.

FIG. 8 schematically illustrates is an apparatus for extracting power from a fluid flow according to a fourth example embodiment of the invention. In this embodiment the fluid directing arrangement 100 has a central channel 116 which extends to form a bellmouth 112, 114 upstream of the flow accelerating constriction. The Venturi 100 is axially symmetric and the air inlet 200c is situated substantially on the axis of the bellmouth 112, 114. Identical blades 522, 524 are situated in the bellmouth such that incoming water passes through the blades as it enters the Venturi 100. The blades 522, 524 are slightly offset from a radius of the channel in which they are situated so that they impart angular momentum to the water before it enters the flow accelerating constriction of the main channel of the Venturi. The pressure at the air inlet 200c will be at less than atmospheric pressure (say at 0.25 $P_0$) due to the suction created in the channel of the Venturi.

In the embodiment of FIG. 8 the Venturi channel extends up towards the water surface from constriction 116 to tail 118, the diameter of the channel increasing towards the tail. The obstruction presented by the Venturi to the incoming water results in a difference in water level upstream and downstream of the Venturi. This difference in water level $\Delta H$ is known as a pressure head. Air at atmospheric pressure $P_0$ enters the turbine 300 and flows down the conduit 220 to the air inlet 220c where it is entrained in the water and sucked into the Venturi channel 116. The entrained air bubbles expand as they rise up through the Venturi channel and encourage air and water flow through the flow accelerating constriction. The expanding air helps to pull the water through the Venturi channel. Flow of air through the flow accelerating constriction drives the turbine 300.

In embodiments of the invention, the fluid driveable engine 300 could be a turbine such as a rotary vane turbine or a reciprocating engine such as a piston in a cylinder. In one example embodiment, a heat exchanger 600 is situated at the exhaust of the fluid driveable engine and receives cool air generated by expansion through the fluid-driveable engine. The heat exchanger is used to at least partially freeze dry potentially damp air (having been entrained in the water flow on passage through the fluid directing arrangements) received by the fluid collection tank prior to circulating it through the fluid-driveable engine. The drying of air to supplying it as input to the fluid driveable engine is particularly advantageous in a marine installation. Considering the example of the turbine, as air expands through the turbine any water vapour present in the air inflow will expand and cool so that the water vapour may freeze bringing the salt from the marine water vapour out of solution. Unless action (such as pre-drying the air) is taken, then the high speed turbine blades are likely to be bombarded by crystals of ice and salt, which could lead to rapid erosion.

In a further example embodiment a heat exchanger 600 is connected to a heat exchange circuit 650 (e.g. a further driving fluid such as a chilled water circuit) of a nearby plant 700 such as an air conditioning plant. In this embodiment the expansion of the fluid driveable engine provides cooling which can be utilized in the nearby plant. This benefit is in addition to the power generated from the fluid driveable engine.

The invention claimed is:

1. An apparatus for extracting power from a fluid flow, the apparatus comprising:
   a fluid driveable engine;
   a fluid directing arrangement formed to define a channel in the flow of a primary fluid, the channel having a flow accelerating constriction shaped such that the primary fluid accelerates as it passes through the flow accelerating constriction, the fluid directing arrangement being formed to impart a rotational flow component to the primary fluid entering the flow accelerating constriction thereby creating a radial pressure gradient in the primary fluid as it passes through the flow accelerating constriction;
   a conduit for directing flow of a driving fluid, the driving fluid and the primary fluid being different fluids, the conduit being in fluid communication with the fluid driveable engine and a portion of the channel having accelerated fluid flow;
   in which the flow of driving fluid through the conduit via the rotational flow of the primary fluid in the flow accelerating constriction acts to drive the fluid driveable engine and the driving fluid is delivered to the fluid directing arrangement in response to suction pressure developed by the flow accelerating constriction such that the driving fluid is drawn substantially along the central axis of the rotational flow; whereby
   the fluid directing arrangement comprises at least one fluid deflector upstream of the flow accelerating constriction, the at least one fluid deflector being operable to impart angular momentum to the primary fluid.

2. Apparatus according to claim 1, in which the at least one deflector is operable to impart a substantially constant angular velocity of rotational flow to all primary fluid entering the fluid accelerating constriction.

3. Apparatus according to claim 1, in which the at least one deflector is a static structure.

4. Apparatus according to claim 1, in which the at least one deflector is a stator having blades disposed to impart angular momentum to fluid passing across the blades.

5. Apparatus according to claim 1 comprising at least one fluid collection tank for collecting driving fluid downstream of the flow accelerating constriction, the fluid collection tank being in fluid communication with the fluid driveable engine.

6. Apparatus according to claim 5, in which the at least one fluid collection tank collects fluid via a bore extending through a wall of the fluid directing arrangement into the channel.

7. Apparatus according to claim 5, in which the fluid collection tank comprises a rotation inhibiting member for at least partially stopping rotation of inflowing fluid.

8. Apparatus according to claim 5, comprising a rotation inhibiting member situated between the flow accelerating constriction and the fluid collection tank.

9. Apparatus according to claim 1, in which there is a single stage of pressure amplification of the fluid flow, the pressure amplification being provided by the flow accelerating constriction.

10. Apparatus according to claim 1, in which the primary fluid comprises water.

11. Apparatus according to claim 1, in which the driving fluid comprises air.

12. Apparatus according to claim 1, in which the fluid directing arrangement is situated below the surface of the primary fluid and the fluid driveable engine is situated above the surface of the primary fluid.

13. Apparatus according to claim 1, in which the fluid driveable engine comprises a turbine.

14. Apparatus according to claim 12, comprising a heat exchanger in the driving fluid flow path at a driving fluid exhaust of the turbine.

15. Apparatus according to claim 13, in which the heat exchanger is arranged to cool the driving fluid.

16. Apparatus according to claim 13, in which the heat exchanger is arranged to cool a further driving fluid in communication with an external plant.

17. Apparatus according to claim 1, comprising a barrier for creating a difference in primary fluid level across the fluid directing arrangement.

18. Apparatus according to claim 1, wherein the central axis of the rotational flow before entry to the accelerating constriction is substantially perpendicular to the surface of the primary fluid.

* * * * *